United States Patent
Martinez, Sr.

(10) Patent No.: US 6,532,119 B1
(45) Date of Patent: Mar. 11, 2003

(54) LAMINATED FILM FOR THIN FILM MIRRORS

(76) Inventor: Eugene Martinez, Sr., 3 Woodbine Rd., Irvington, NY (US) 10533

(*) Notice: Subject to any disclaimer, the term of this patent is extended or adjusted under 35 U.S.C. 154(b) by 0 days.

(21) Appl. No.: 09/476,662

(22) Filed: Jan. 3, 2000

Related U.S. Application Data

(63) Continuation-in-part of application No. 09/129,447, filed on Jul. 30, 1998, now abandoned.

(51) Int. Cl.[7] .............................. G02B 5/08; G02B 7/182
(52) U.S. Cl. ......................................... 359/884; 359/883
(58) Field of Search ................................ 359/846, 847, 359/883, 884

(56) References Cited

U.S. PATENT DOCUMENTS

| | | | | |
|---|---|---|---|---|
| 3,739,271 A | * | 6/1973 | Wetzel | 359/839 |
| 3,937,863 A | * | 2/1976 | Moore | 428/410 |
| 3,958,245 A | * | 5/1976 | Cherenko et al. | 428/421 |
| 4,429,005 A | * | 1/1984 | Penn | 428/350 |
| 5,991,072 A | * | 11/1999 | Solyntjes et al. | 359/361 |
| 6,096,410 A | * | 8/2000 | Okajima et al. | 428/195 |

* cited by examiner

Primary Examiner—Cassandra Spyrou
Assistant Examiner—Alessandro V. Amari
(74) Attorney, Agent, or Firm—Darby & Darby

(57) ABSTRACT

A laminated film including two polyester films each having a thermal shrinkage. A metal layer is deposited on one surface of at least one of the polyester films which are secured together using a laminating adhesive to form a laminated reflector film. In one embodiment in which the laminated film is used to manufacture a thin film mirror using a wrap around technique, the thickness of each of the polyester films is less than or equal to approximately 0.001 inch and a total combined thickness of less than or equal to approximately 0.002 inch (50 microns) thick. Preferably, each polyester film has a thickness of approximately 0.0005 inch and a total thickness of approximately 0.001 inch. Alternatively, the laminated film may be used to manufacture a thin film mirror using a face bond technique, wherein the total combined thickness of the two polyester films is less than or equal to approximately 0.004 inch, preferably the total thickness is less than or equal to approximately 0.003 inch. The polyester film used to form the laminated film may be thinner than conventional films used to manufacture thin film mirrors thereby producing a sharper, brighter, and higher contrast image without sacrificing the handling characteristics and strength associated with conventional thicker films.

62 Claims, 3 Drawing Sheets

LAMINATED FILM FOR THIN FILM MIRRORS

CROSS-REFERENCE TO RELATED APPLICATION

This application is a continuation-in-part of U.S. patent application Ser. No. 09/129,447, filed on Jul. 30, 1998 now abandoned.

BACKGROUND OF THE INVENTION

1. Field of the Invention

This invention generally relates to thin film mirrors, and more particularly, to a laminated film for thin film mirrors.

2. Discussion of the Related Art

Glass mirrors have been used for centuries and characteristically include a piece of glass as the substrate carrier for supporting a reflective metal coating. There are generally two types of glass mirrors, e.g. medicine cabinet mirrors and optical mirrors. Medicine cabinet mirrors are the most common type of glass mirrors and are considered "second-surface" mirrors in that they comprise a metal surface, one side of which is covered by a piece of glass and the other side of which may be covered with a protective coating. When looking through the glass the reflection is seen on the metal surface beneath the glass. The second type of glass mirrors are optical mirrors, which are considered "first-surface" mirrors because the reflective metal is applied directly to the surface of the piece of glass that serves only as a substrate carrier for the metal. The reflection is observed directly on the face of the metal, which is typically protected by a protective coating such as silicone oxide.

Relatively small size glass mirrors are efficient and cost effective, however, in larger size mirrors, as for example, 24 inches×36 inches and greater, the increased weight, potential for breakage, and difficulty in realizing a desired substantially planar surface for optical purposes results in mechanical and safety problems.

Thin film mirrors have been developed to overcome the disadvantages associated with glass mirrors. These mirrors are particularly advantageous as a substitute for relatively large glass mirrors because of their relative light weight and structural stability (substantially flat surface).

The film used to manufacture thin film mirrors is typically a transparent polyester film, such as polyethylene terephthalate, having a bi-axially oriented thermal shrinkage, that is, the film undergoes thermal shrinkage in both the machine (longitudinal) direction of the film and in the transverse (lateral) direction of the film. A reflective metal layer is applied to one side of the film and a coating may be applied to the exposed surface of the reflective metal to protect it from corrosion and rough handling. U.S. Pat. No. 4,666,263 describes an alternative method of protecting the reflective metal by adding other metals to it. When the thin film mirror is used in a benign environment, the reflective metal may be left exposed.

Generally the thickness of the polyester film is between approximately 0.001 inch (25 microns) and approximately 0.002 inch (50 microns). Thinner films are advantageous in that they exhibit enhanced reflectivity, contrast, and resolution, but are fragile and awkward to handle during manufacture.

It is therefore desirable to provide a laminated film for use in thin film mirrors that solves the aforementioned problems associated with thinner films.

SUMMARY OF THE INVENTION

It is an object of the present invention to provide a laminated film for a thin film mirror in which light rays pass through a thinner polyester film than conventional films thereby producing a sharper, brighter, and higher contrast image.

It is a further object of the invention to provide a laminated film for a thin film mirror which retains the handling characteristics and strength associated with films of conventional thickness.

In accordance with the above-mentioned and other objects, a laminated film is provided for a thin film mirror. The inventive laminated film includes a transparent first polyester film, a first reflective metal layer deposited on one surface of the first polyester film, a laminating adhesive covering at least a portion of the first reflective layer, and a second polyester film affixed to the first reflective metal layer by the laminating adhesive. The thickness of the first polyester film is substantially equal to the thickness of the second polyester film. In addition, the first and second polyester films each have a thermal shrinkage and a thickness less than or equal to approximately 0.001 inch. Together the total thickness of the first and second polyester films is less than or equal to approximately 0.002 inch. In an alternative embodiment the arrangement of the first reflective metal layer and laminating adhesive may be interchanged.

The invention also relates to a process for forming a laminated film for the thin film mirror as described above. Initially, a reflective metal is deposited on one surface of a transparent first polyester film having a thermal shrinkage and a thickness less than or equal to approximately 0.001 inch. The reflective metal deposited on the first polyester film is then affixed to a second polyester film having a thermal shrinkage and a thickness less than or equal to approximately 0.001 inch using a laminating adhesive. The thickness of the first polyester film is substantially equal to the thickness of the second polyester film, and a total thickness of the first and second polyester films is less than or equal to approximately 0.002 inch. In an alternative process in accordance with the present invention, the reflective metal may be deposited on one surface of a first polyester film having a thermal shrinkage and a thickness less than or equal to approximately 0.001 inch. The reflective metal deposited on the first polyester film is then affixed to a second transparent polyester film having a thermal shrinkage and a thickness less than or equal to approximately 0.001 inch using a laminating adhesive. The thickness of the first polyester film is substantially equal to the thickness of the second polyester film, and a total thickness of the first and second polyester films is less than or equal to approximately 0.002 inch.

In addition the present invention is directed to a laminated film for a thin film mirror including a transparent first polyester film, a first reflective metal layer deposited on one surface of the first polyester film, a second polyester film, a second reflective metal layer deposited on one surface of the second polyester film, and a laminating adhesive interposed between the first and second reflective metal layers. The thickness of the first polyester film is substantially equal to the thickness of the second polyester film. In addition, the first and second polyester films each have a thermal shrinkage and a thickness less than or equal to approximately 0.001 inch. Together the thickness of the first and second polyester films is less than of equal to approximately 0.002 inch.

The invention also relates to a process for manufacturing the laminated film for a thin film mirror. Initially, a first reflective metal is deposited on one surface of a transparent first polyester film having a thermal shrinkage and a thickness less than or equal to approximately 0.001 inch and a second reflective metal is deposited on one surface of a second polyester film having a thermal shrinkage and a thickness less than or equal to approximately 0.001 inch. Then, the first and second polyester films are affixed together so that the first reflective metal is in intimate contact with the second reflective metal. The first and second polyester films are selected so that their respective thicknesses are substantially equal and the total thickness of the two polyester films is less than or equal to approximately 0.002 inch.

Furthermore, the present invention is directed to the laminated film and process for manufacturing the laminated film as described above, except that instead of using polyester films each having a thickness less than or equal to approximately 0.001 inch, the only constraint used to select the films is that the total combined thickness of the first and second polyester films be less than or equal to approximately 0.004 inch.

BRIEF DESCRIPTION OF THE DRAWINGS

In the drawings, where like reference numerals denote similar elements throughout the several views, and wherein.

DETAILED DESCRIPTION OF THE PREFERRED EMBODIMENTS

Figure 1A:
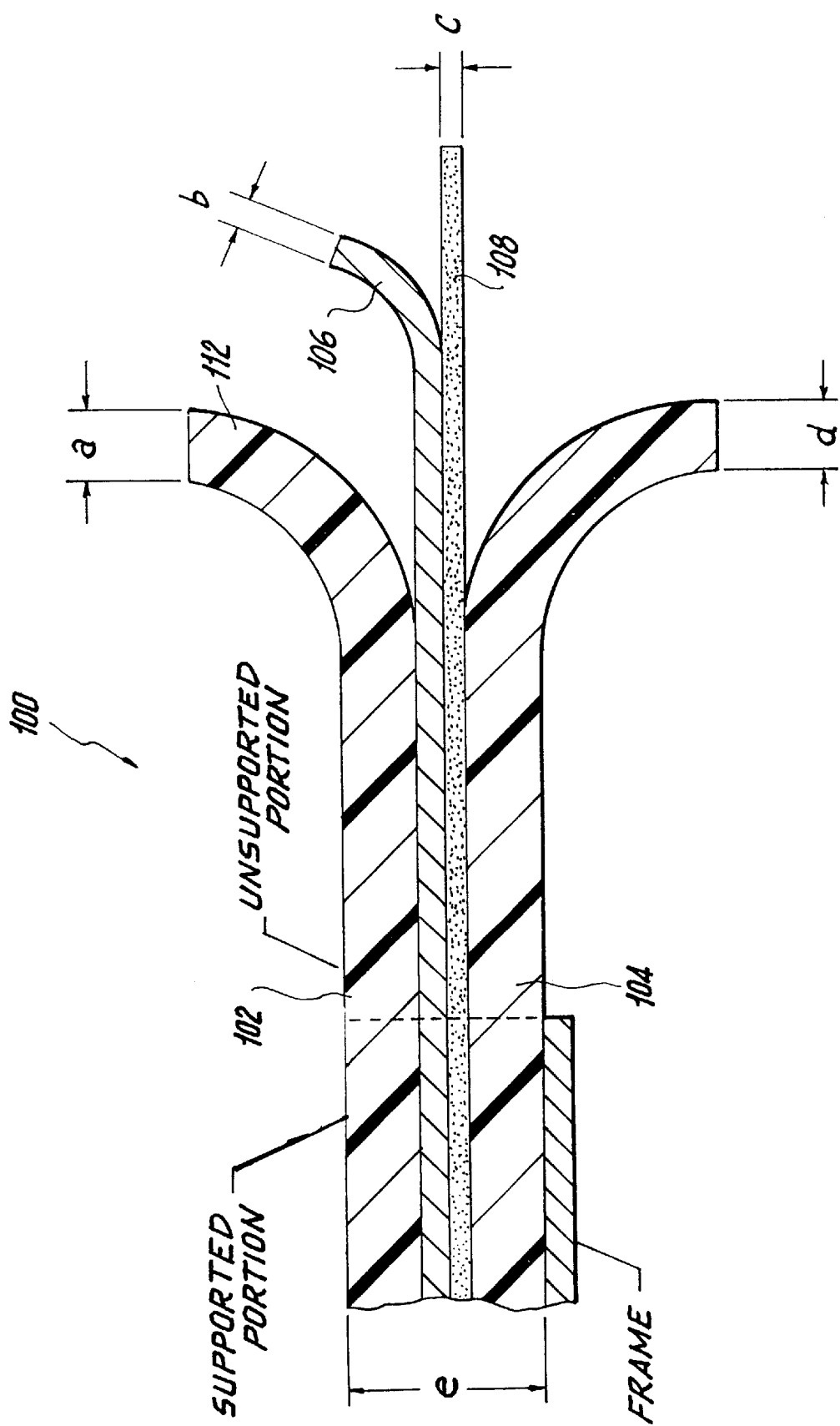
FIG. 1a is a cross-sectional view of a laminated film for a thin film mirror in accordance with the present invention with the layers peeled back.
Figure 1B:
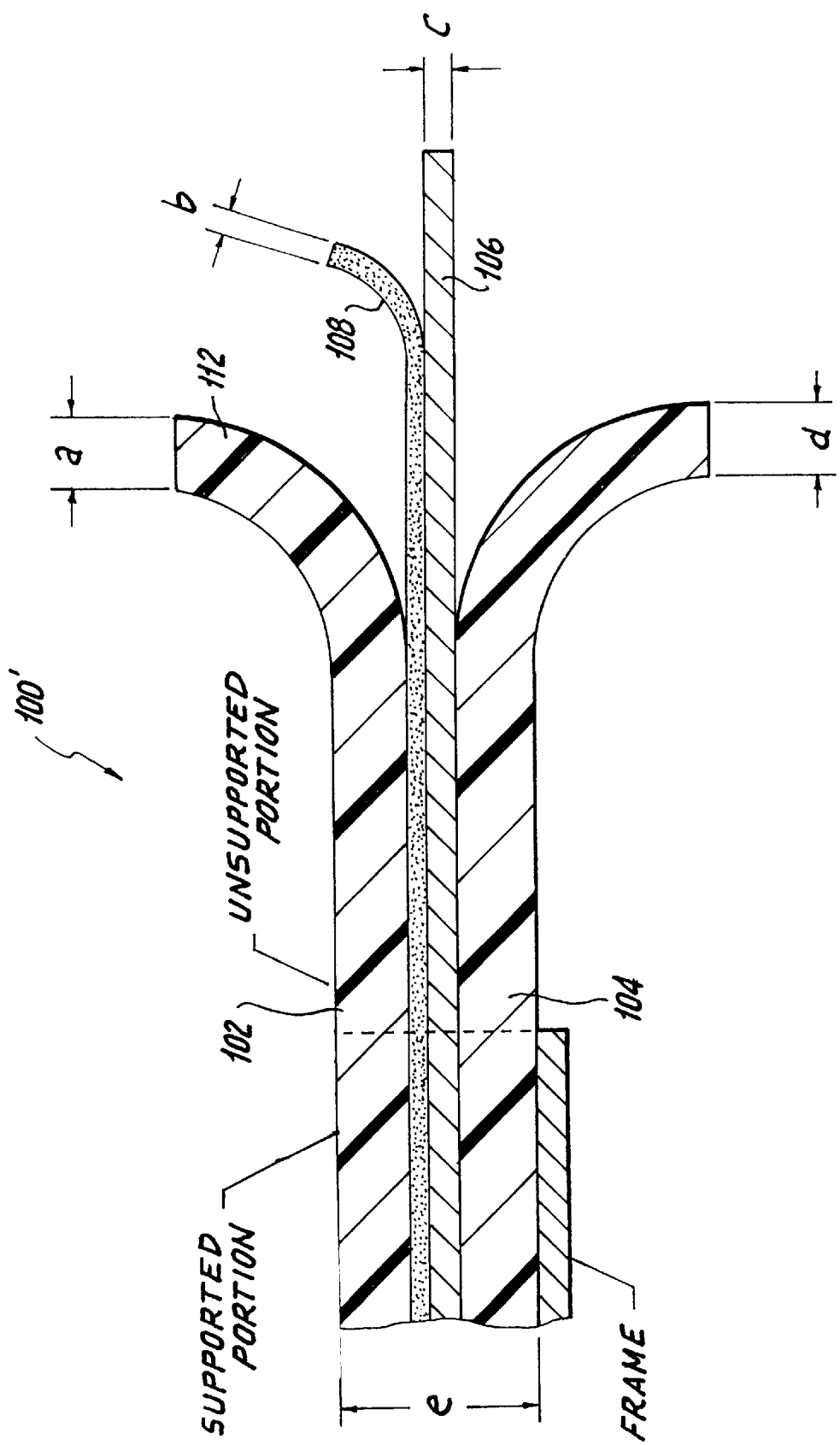
FIG. 1b is a cross-sectional view of an alternative laminated film for a thin film mirror in accordance with the present invention with the layers peeled back.

FIG. 1a is a cross-sectional view of a first embodiment of a laminated film 100 for a thin film mirror in accordance with the invention. Laminated film 100 includes a transparent first polyester film 102, a reflective metal layer 106 deposited on one surface 112 of the first polyester film, a laminating adhesive 108, and a second polyester film 104 affixed to the reflective metal layer 106 by the laminating adhesive 108. A second embodiment of a laminated film 100' for a thin film mirror in accordance with the invention is shown in FIG. 1b. The second embodiment is similar to the first embodiment, except that the arrangement of the reflective metal layer 106 and laminating adhesive 108 are switched. Thus, the laminated film 100 includes a transparent first polyester film 102, a laminating adhesive 108 deposited on one surface 112 of the first polyester film, a reflective metal layer 106, and a second polyester film 104 affixed to the reflective metal layer 106.

Figure 2:
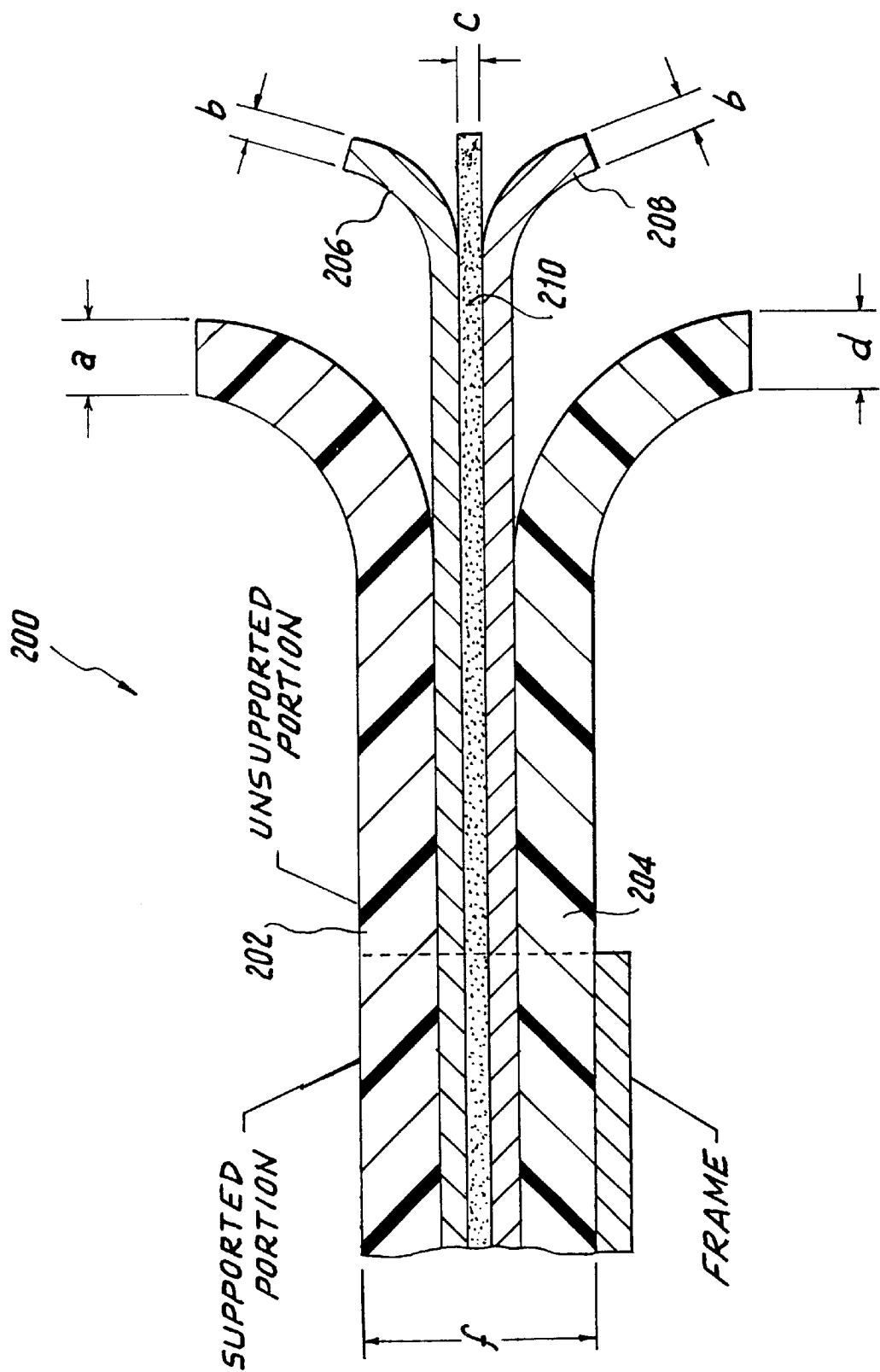
FIG. 2 is a cross-sectional view of another embodiment of a laminated film for a thin film mirror in accordance with the present invention with the layers peeled back.

FIG. 2 is a cross-sectional view of another embodiment of a laminated film for a thin film mirror. This embodiment is the same as that described above, except that a second reflective metal layer is deposited on one surface of the second polyester film. In particular, laminated film 200 includes a transparent first polyester film 202, a first reflective metal layer 206 deposited on one surface of the first film, a laminating adhesive 210 covering the exposed surface of the reflective metal layer, a second reflective metal layer 208 secured to the first reflective metal layer 206 by the laminating adhesive, and a second polyester film 204 covering the second reflective metal layer 208. Polyester films 202, 204 have a bi-axially oriented thermal shrinkage. This alternate embodiment is advantageous in that both the first and second polyester films that constitute the laminate may be made from a continuous production, thereby more likely assuring a balanced laminate.

The laminated film, as a finished product, may be applied to a frame or panel such as that described in U.S. Pat. Nos. 3,687,524; 3,757,479 and 3,877,139, which are herein incorporated by reference, and shrunk tightly on the frame using a thermal tensioning process to produce a thin film mirror.

A description is provided of the physical and/or optical characteristics of the polyester films, reflective metal layer and laminating adhesive for the aforementioned embodiments. The polyester films 102, 104 have a bi-axially oriented thermal shrinkage. Laminating adhesive 108 is preferably a polyester-based adhesive, however, other adhesives such as vinyl may also be used. Polyester film 104 provides support to the first polyester film 102 and protects the reflective metal layer 106 so that it is substantially impervious to environmental conditions, such as salt fog, humidity and common household products.

In a preferred embodiment, the polyester film 102 exhibits a haze (optical clarity) of less than or equal to approximately 0.3% as measured by ASTM-D1003 and has a luminous transmission of greater than or equal to approximately 85% as measured by ASTMD-D1003. The second polyester film 104 may, but need not necessarily, exhibit similar optical characteristics.

The shrink characteristics of the polyester film are essential to the thermal tensioning process by which a substantially flat (plano) optical surface is achieved after the film has been applied to a frame. In prior art films used to manufacture thin film mirrors the reflective metal layer is generally coated with a resin, which is a mixture of vinyl and a solvent, to protect against corrosion and rough handling. Prior to winding the film on a spool, heat is applied to evaporate the solvent so that the film does not adhere to itself when rolled. This heating process at best reduces the film's shrinkage and at worst eliminates the film's shrinkage completely. When using conventional films, it is therefore necessary to select a sufficiently large shrink characteristic of the polyester film to ensure that after the solvent has been evaporated from the resin an adequate amount of film shrinkage remains to perform the thermal tensioning process.

On the other hand, the present inventive laminated film is manufactured using a process that does not require heat and, thus, has no effect on the film's shrinkage. In a preferred embodiment, the polyester film is selected so that during a shrink test, wherein the film sample is held unrestricted at approximately 150° C. for approximately 30 minutes, the film undergoes a thermal shrinkage greater than or equal to approximately 0.8% in the machine (longitudinal) direction of the film and greater than or equal to approximately 0.6% in the transverse (lateral direction) direction of the film. The shrink characteristics of both pieces of the polyester films 102, 104 are preferably substantially balanced.

Polyester films 102, 202 have a thickness "a" and polyester films 104, 204 have a thickness "d". The thicknesses "a" and "d" may be selected so that each film is less than or equal to approximately 0.001 inch (25 microns). Preferably, thickness 'a' and 'd' are substantially the same and each approximately equal to 0.0005 inch (12 microns). Thickness "b" of the reflective metal layer 106, 206, 208 and "c" of the laminating adhesive 108, 210 are negligible. Thus, the laminated film 100, 100', 200, as a finished product, has a total thickness "e", "e", "f", respectively, less than or equal to approximately 0.002 inch (50 microns), preferably less than or equal to approximately 0.001 inch (25 microns), in order to preserve the handling characteristics and strength associated with conventional films of a similar thickness. The thicknesses are advantageous when manufacturing a thin film mirror using a wrap around technique, such as that disclosed in U.S. Pat. Nos. 3,877,139; 3,687,524; and 3,757,479. Thicker films may be too rigid and thus, not be readily deformable around the sides of the frame.

In an alternative embodiment, the only constraint placed on the thicknesses of the polyester films 102, 104 is that the laminated film 100, 100', 200, as a finished product, has a total thickness "e", "e", "f", respectively, less than or equal to approximately 0.004 inch. The thickness "a" and "d" of the polyester films 102, 104, respectively, may be the same or different. This alternative embodiment is advantageous when manufacturing a thin film mirror using a face bond technique, such as that disclosed in U.S. Pat. No. 5,247,395, which does not require that the laminated film be deformed around the sides of the frame. Therefore, the total thickness of the laminated film used with the face bond technique may be greater than when using the wrap around technique.

In conventional thin film mirrors incident light must pass through a polyester film, which is between 0.001 inch to 0.002 inch thick before being reflected by the reflective metal layer. On the other hand, in the present invention, incident light passes through only the first polyester film 102, which is preferably thinner than conventional polyester film, before being reflected by the reflective metal layer 106. Since the thickness of the film through which the incident light passes is preferably less in the present invention than that of conventional films a sharper, brighter, and higher contrast image is produced.

Reflecting metal layer 106 may be any metal, for example, silver or aluminum, which can be deposited on the polyester film using known methods such as sputtering or vacuum depositing. The deposited metal preferably has an optical density between approximately 3.0 and approximately 3.5 as measured by a transmission densitometer.

The quality of the image produced depends on the topography of the surface of the polyester films. In particular, the surface of the polyester films preferably has a substantially evenly distributed moire pattern. Moreover, the films are preferably substantially free from parallel striations running in the machine (longitudinal) direction and/or transverse (lateral) direction, which may distort the reflected image and/or produce unwanted light and dark bands when light projected on the reflective mirror surface is reflected onto a screen, for example, a front or rear projection screen.

In a preferred embodiment, to ensure a substantially balanced structure when the first and second polyester films are laminated together and to make certain that the physical and optical characteristics of the two films are substantially the same, it is preferred that the first and second polyester films come from the same manufacturing lot or production run of film. It is, however, contemplated and within the intended scope of the present invention to use two different films, for example, having different optical and/or physical characteristics.

Thus, the inventive laminated film achieves greater overall optical performance than conventional thicker films and has a greater resistance to environmental conditions, which would otherwise reduce or destroy the usefulness of the film as an efficient reflector.

While the embodiments shown and described are fully capable of achieving the objects and advantages of the invention, it is to be understood that these embodiments are shown and described solely for the purpose of illustration and not for limitation. It is contemplated that many changes and modifications may be made to the present invention without departing from the spirit and scope of the invention as disclosed above.

What is claimed is:

1. A laminated film for a thin film mirror, said laminated film including a first portion supported by a frame and a second unsupported portion, comprising:

a transparent first polyester film having a thermal shrinkage and a thickness less than or equal to approximately 0.001 inch;

a first reflective metal layer deposited on one surface of said first polyester film;

a laminating adhesive covering at least a portion of said first reflective layer; and a second polyester film affixed to said first reflective metal layer by said laminating adhesive, said second polyester film having a thermal shrinkage and a thickness less than or equal to approximately 0.001 inch;

wherein the thickness of said first polyester film is substantially equal to the thickness of said second polyester film, and a total thickness of said first and second polyester films is less than or equal to approximately 0.002 inch and is sufficient to support said second unsupported portion when said laminated film is mounted on said frame wherein said first and second polyester films have a haze less than or equal to approximately 0.3%.

2. A laminated film for a thin film mirror, said laminated film including a first portion supported by a frame and a second unsupported portion, comprising:

a transparent first polyester film having a thermal shrinkage and a thickness less than or equal to approximately 0.001 inch;

a first reflective metal layer deposited on one surface of said first polyester film;

a laminating adhesive covering at least a portion of said first reflective layer; and a second polyester film affixed to said first reflective metal layer by said laminating adhesive, said second polyester film having a thermal shrinkage and a thickness less than or equal to approximately 0.001 inch;

wherein the thickness of said first polyester film is substantially equal to the thickness of said second polyester film, and a total thickness of said first and second polyester films is less than or equal to approximately 0.002 inch and is sufficient to support said second unsupported portion when said laminated film is mounted on said frame wherein said first and second polyester films have a luminous transmission greater than or equal to approximately 85%.

3. A laminated film for a thin film mirror, said laminated film including a first portion supported by a frame and a second unsupported portion, comprising:

a transparent first polyester film having a thermal shrinkage and a thickness less than or equal to approximately 0.001 inch;

a first reflective metal layer deposited on one surface of said first polyester film;

a laminating adhesive covering at least a portion of said first reflective layer; and a second polyester film affixed to said first reflective metal layer by said laminating adhesive, said second polyester film having a thermal shrinkage and a thickness less than or equal to approximately 0.001 inch;

wherein the thickness of said first polyester film is substantially equal to the thickness of said second polyester film, and a total thickness of said first and second polyester films is less than or equal to approximately 0.002 inch and is sufficient to support said second unsupported portion when said laminated film is mounted on said frame wherein said first and second polyester films have a thermal shrinkage greater than or equal to approximately 0.8% in a machine direction of the film and a thermal shrinkage greater than or equal to approximately 0.6% in a transverse direction of the film.

4. A process for manufacturing a laminated film for a thin film mirror, said laminated film including a first portion supported by a frame and a second unsupported portion, comprising the steps of:

(a) depositing a reflective metal on one surface of a transparent first polyester film having a thermal shrinkage and a thickness less than or equal to approximately 0.001 inch; and (b) affixing a second polyester film to the reflective metal deposited on the first polyester film using a laminating adhesive, said second polyester film having a thermal shrinkage and a thickness less than or equal to approximately 0.001 inch, the thickness of said first polyester film being substantially equal to the thickness of said second polyester film, and a total thickness of said first and second polyester films is less than or equal to approximately 0.002 inch and is sufficient to support said second unsupported portion when said laminated film is mounted on said frame wherein said first and second polyester films have a haze less than or equal to approximately 0.3%.

5. A process for manufacturing a laminated film for a thin film mirror, said laminated film including a first portion supported by a frame and a second unsupported portion, comprising the steps of:

(a) depositing a reflective metal on one surface of a transparent first polyester film having a thermal shrinkage and a thickness less than or equal to approximately 0.001 inch; and (b) affixing a second polyester film to the reflective metal deposited on the first polyester film using a laminating adhesive, said second polyester film having a thermal shrinkage and a thickness less than or equal to approximately 0.001 inch, the thickness of said first polyester film being substantially equal to the thickness of said second polyester film, and a total thickness of said first and second polyester films is less than or equal to approximately 0.002 inch and is sufficient to support said second unsupported portion when said laminated film is mounted on said frame wherein said first and second polyester films have a luminous transmission greater than or equal to approximately 85%.

6. A process for manufacturing a laminated film for a thin film mirror, said laminated film including a first portion supported by a frame and a second unsupported portion, comprising the steps of:

(a) depositing a reflective metal on one surface of a transparent first polyester film having a thermal shrinkage and a thickness less than or equal to approximately 0.001 inch; and (b) affixing a second polyester film to the reflective metal deposited on the first polyester film using a laminating adhesive, said second polyester film having a thermal shrinkage and a thickness less than or equal to approximately 0.001 inch, the thickness of said first polyester film being substantially equal to the thickness of said second polyester film, and a total thickness of said first and second polyester films is less than or equal to approximately 0.002 inch and is sufficient to support said second unsupported portion when said laminated film is mounted on said frame wherein said first and second polyester films have a thermal shrinkage greater than or equal to approximately 0.8% in a machine direction of the film and a thermal shrinkage greater than or equal to approximately 0.6% in a transverse direction of the film.

7. A laminated film for a thin film mirror, said laminated film including a first portion supported by a frame and a second unsupported portion, comprising:

a transparent first polyester film having a thermal shrinkage and a thickness less than or equal to approximately 0.001 inch;

a first reflective metal layer deposited on one surface of said first polyester film;

a second polyester film having a thermal shrinkage and a thickness less than or equal to approximately 0.001 inch;

a second reflective metal layer deposited on one surface of said second polyester film; and a laminating adhesive interposed between said first and second reflective metal layers;

wherein the thickness of said first polyester film is substantially equal to the thickness of said second polyester film, and a total thickness of said first and second polyester films is less than or equal to approximately 0.002 inch and is sufficient to support said second unsupported portion when said laminated film is mounted on said frame.

8. A laminated film in accordance with claim 7, wherein said laminating adhesive is a polyester-based adhesive.

9. A laminated film in accordance with claim 7, wherein the total thickness of said first and second polyester films is less than or equal to approximately 0.001 inch.

10. A laminated film in accordance with claim 7, wherein said first and second reflective metal layers comprise aluminum.

11. A laminated film in accordance with claim 7, wherein the thickness of each of said first and second polyester films is approximately 0.0005 inch and the total thickness of said first and second polyester films is approximately 0.001.

12. A laminated film in accordance with claim 7, wherein said first and second polyester films have a haze less than or equal to approximately 0.3%.

13. A laminated film in accordance with claim 7, wherein said first and second polyester films have a luminous transmission greater than or equal to approximately 85%.

14. A laminated film in accordance with claim 7, wherein said first and second polyester films have a thermal shrinkage greater than or equal to approximately 0.8% in a machine direction of the film and a thermal shrinkage greater than or equal to approximately 0.6% in a transverse direction of the film.

15. A laminated film in accordance with claim 7, wherein said first and second reflective metals have an optical density between approximately 3.0 and approximately 3.5.

16. A laminated film in accordance with claim 7, wherein said second polyester film is transparent.

17. A laminated film in accordance with claim 7, wherein said first and second polyester films are different.

18. A laminated film in accordance with claim 7, wherein said first and second polyester films have different optical characteristics.

19. A process for manufacturing a laminated film for a thin film mirror, said laminated film including a first portion supported by a frame and a second unsupported portion, comprising the steps of:
(a) depositing a first reflective metal on one surface of a transparent first polyester film having a thermal shrinkage and a thickness less than or equal to approximately 0.001 inch;
(b) depositing a second reflective metal on one surface of a second polyester film having a thermal shrinkage and a thickness less than or equal to approximately 0.001 inch; and
(c) affixing the first and second polyester films together with a laminating adhesive therebetween, the thickness of said first polyester film being substantially equal to the thickness of said second polyester film, and a total thickness of said first and second polyester films is less than or equal to approximately 0.002 inch and is sufficient to support said second unsupported portion when said laminated film is mounted on said frame.

20. A process in accordance with claim 19, wherein the total thickness of said first and second polyester films is less than or equal to approximately 0.001 inch.

21. A process in accordance with claim 19, wherein said first and second reflective metal layers comprise aluminum.

22. A process in accordance with claim 19, wherein the thickness of each of said first and second polyester films is approximately 0.0005 inch and the total thickness of said first and second polyester films is approximately 0.001 inch.

23. A process in accordance with claim 19, wherein said first and second polyester films have a haze less than or equal to approximately 0.3%.

24. A process in accordance with claim 19, wherein said first and second polyester films have a luminous transmission greater than or equal to approximately 85%.

25. A process in accordance with claim 19, wherein said first and second polyester films have a thermal shrinkage greater than or equal to approximately 0.8% in a machine direction of the film and a thermal shrinkage greater than or equal to approximately 0.6% in a transverse direction of the film.

26. A process in accordance with claim 19, wherein said first and second reflective metals have an optical density between approximately 3.0 and approximately 3.5.

27. A process in accordance with claim 19, wherein said second polyester film is transparent.

28. A process in accordance with claim 19, wherein said first and second polyester films are different.

29. A process in accordance with claim 19, wherein said first and second polyester films have different optical characteristics.

30. A laminated film for a thin film mirror, comprising:
a transparent first polyester film having a thermal shrinkage and a thickness less than or equal to approximately 0.001 inch, said first polyester film having an adhering surface and an exposed surface;
a first reflective metal layer deposited on the adhering surface of said first polyester film;
a second polyester film having a thermal shrinkage and a thickness less than or equal to approximately 0.001 inch, said second polyester film having an adhering surface and an exposed surface;
a second reflective metal layer deposited on the adhering surface of said second polyester film; and
a laminating adhesive interposed between said first and second reflective metal layers;
wherein the thickness of said first polyester film is substantially equal to the thickness of said second polyester film, and a total thickness of said first and second polyester films is less than or equal to approximately 0.002 inch.

31. A process for manufacturing a laminated film for a thin film mirror, comprising the steps of:
(a) depositing a first reflective metal on an adhering surface of a transparent first polyester film having a thermal shrinkage and a thickness less than or equal to approximately 0.001 inch, said first polyester film having an exposed surface disposed opposite the adhering surface;
(b) depositing a second reflective metal on an adhering surface of a second polyester film having a thermal shrinkage and a thickness less than or equal to approximately 0.001 inch, said second polyester film having an exposed surface disposed opposite the adhering surface; and
(c) affixing the first and second polyester films together with a laminating adhesive interposed therebetween, the thickness of said first polyester film being substantially equal to the thickness of said second polyester film, and a total thickness of said first and second polyester films is less than or equal to approximately 0.002 inch.

32. A laminated film for a thin film mirror, said laminated film including a first portion supported by a frame and a second unsupported portion, comprising:
a transparent first polyester film having a thermal shrinkage;
a first reflective metal layer deposited on one surface of said first polyester film;
a laminating adhesive covering at least a portion of said first reflective layer; and
a second polyester film affixed to said first reflective metal layer by said laminating adhesive, said second polyester film having a thermal shrinkage, a total thickness of said first and second polyester films being less than or equal to approximately 0.004 inch and being sufficient to support said second unsupported portion when said laminated film is mounted on said frame
wherein said first and second polyester films have a haze less than or equal to approximately 0.3%.

33. A laminated film for a thin film mirror, said laminated film including a first portion supported by a frame and a second unsupported portion, comprising:
a transparent first polyester film having a thermal shrinkage;
a first reflective metal layer deposited on one surface of said first polyester film;
a laminating adhesive covering at least a portion of said first reflective layer; and
a second polyester film affixed to said first reflective metal layer by said laminating adhesive, said second polyester film having a thermal shrinkage, a total thickness of said first and second polyester films being less than or equal to approximately 0.004 inch and being sufficient to support said second unsupported portion when said laminated film is mounted on said frame
wherein said first and second polyester films have a luminous transmission greater than or equal to approximately 85%.

34. A laminated film for a thin film mirror, said laminated film including a first portion supported by a frame and a second unsupported portion, comprising:
  a transparent first polyester film having a thermal shrinkage;
  a first reflective metal layer deposited on one surface of said first polyester film;
  a laminating adhesive covering at least a portion of said first reflective layer; and
  a second polyester film affixed to said first reflective metal layer by said laminating adhesive, said second polyester film having a thermal shrinkage, a total thickness of said first and second polyester films being less than or equal to approximately 0.004 inch and being sufficient to support said second unsupported portion when said laminated film is mounted on said frame
  wherein said first and second polyester films have a thermal shrinkage greater than or equal to approximately 0.8% in a machine direction of the film and a thermal shrinkage greater than or equal to approximately 0.6% in a transverse direction of the film.

35. A process for manufacturing a laminated film for a thin film mirror, said laminated film including a first portion supported by a frame and a second unsupported portion, comprising the steps of:
  (a) depositing a reflective metal on one surface of a transparent first polyester film having a thermal shrinkage; and
  (b) affixing a second polyester film to the reflective metal deposited on the first polyester film using a laminating adhesive, said second polyester film having a thermal shrinkage, a total thickness of said first and second polyester films being less than or equal to approximately 0.004 inch and being sufficient to support said second unsupported portion when said laminated film is mounted on said frame
  wherein said first and second polyester films have a haze less than or equal to approximately 0.3%.

36. A process for manufacturing a laminated film for a thin film mirror, said laminated film including a first portion supported by a frame and a second unsupported portion, comprising the steps of:
  (a) depositing a reflective metal on one surface of a transparent first polyester film having a thermal shrinkage; and
  (b) affixing a second polyester film to the reflective metal deposited on the first polyester film using a laminating adhesive, said second polyester film having a thermal shrinkage, a total thickness of said first and second polyester films being less than or equal to approximately 0.004 inch and being sufficient to support said second unsupported portion when said laminated film is mounted on said frame
  wherein said first and second polyester films have a luminous transmission greater than or equal to approximately 85%.

37. A process for manufacturing a laminated film for a thin film mirror, said laminated film including a first portion supported by a frame and a second unsupported portion, comprising the steps of:
  (a) depositing a reflective metal on one surface of a transparent first polyester film having a thermal shrinkage; and
  (b) affixing a second polyester film to the reflective metal deposited on the first polyester film using a laminating adhesive, said second polyester film having a thermal shrinkage, a total thickness of said first and second polyester films being less than or equal to approximately 0.004 inch and being sufficient to support said second unsupported portion when said laminated film is mounted on said frame
  wherein said first and second polyester films have a thermal shrinkage greater than or equal to approximately 0.8% in a machine direction of the film and a thermal shrinkage greater than or equal to approximately 0.6% in a transverse direction of the film.

38. A laminated film for a thin film mirror, said laminated film including a first portion supported by a frame and a second unsupported portion, comprising:
  a transparent first polyester film having a thermal shrinkage;
  a first reflective metal layer deposited on one surface of said first polyester film;
  a second polyester film having a thermal shrinkage;
  a second reflective metal layer deposited on one surface of said second polyester film; and
  a laminating adhesive interposed between said first and second reflective metal layers, a total thickness of said first and second polyester films being less than or equal to approximately 0.004 inch and being sufficient to support said second unsupported portion when said laminated film is mounted on said frame.

39. A laminated film in accordance with claim 38, wherein said laminating adhesive is a polyester-based adhesive.

40. A laminated film in accordance with claim 38, wherein the total thickness of said first and second polyester films is less than or equal to approximately 0.003 inch.

41. A laminated film in accordance with claim 38, wherein said first and second reflective metal layers comprise aluminum.

42. A laminated film in accordance with claim 38, wherein the thickness of each of said first and second polyester films is substantially equal.

43. A laminated film in accordance with claim 38, wherein said first and second polyester films have a haze less than or equal to approximately 0.3%.

44. A laminated film in accordance with claim 38, wherein said first and second polyester films have a luminous transmission greater than or equal to approximately 85%.

45. A laminated film in accordance with claim 38, wherein said first and second polyester films have a thermal shrinkage greater than or equal to approximately 0.8% in a machine direction of the film and a thermal shrinkage greater than or equal to approximately 0.6% in a transverse direction of the film.

46. A laminated film in accordance with claim 38, wherein said first and second reflective metals have an optical density between approximately 3.0 and approximately 3.5.

47. A laminated film in accordance with claim 38, wherein said second polyester film is transparent.

48. A laminated film in accordance with claim 38, wherein said first and second polyester films are different.

49. A laminated film in accordance with claim 38, wherein said first and second polyester films have different optical characteristics.

50. A process for manufacturing a laminated film for a thin film mirror, said laminated film including a first portion supported by a frame and a second unsupported portion, comprising the steps of:
  (a) depositing a first reflective metal on one surface of a transparent first polyester film having a thermal shrinkage;

(b) depositing a second reflective metal on one surface of a second polyester film having a thermal shrinkage; and (c) affixing the first and second polyester films together with a laminating adhesive therebetween, a total thickness of said first and second polyester films being less than or equal to approximately 0.004 inch and being sufficient to support said second unsupported portion when said laminated film is mounted on said frame.

51. A process in accordance with claim 50, wherein the total thickness of said first and second polyester films is less than or equal to approximately 0.003 inch.

52. A process in accordance with claim 50, wherein said first and second reflective metal layers comprise aluminum.

53. A process in accordance with claim 50, wherein the thickness of each of said first and second polyester films is substantially equal.

54. A process in accordance with claim 50, wherein said first and second polyester films have a haze less than or equal to approximately 0.3%.

55. A process in accordance with claim 50, wherein said first and second polyester films have a luminous transmission greater than or equal to approximately 85%.

56. A process in accordance with claim 50, wherein said first and second polyester films have a thermal shrinkage greater than or equal to approximately 0.8% in a machine direction of the film and a thermal shrinkage greater than or equal to approximately 0.6% in a transverse direction of the film.

57. A process in accordance with claim 50, wherein said first and second reflective metals have an optical density between approximately 3.0 and approximately 3.5.

58. A process in accordance with claim 50, wherein said second polyester film is transparent.

59. A process in accordance with claim 50, wherein said first and second polyester films are different.

60. A process in accordance with claim 50, wherein said first and second polyester films have different optical characteristics.

61. A laminated film for a thin film mirror, comprising:

a transparent first polyester film having a thermal shrinkage, said first polyester film having an adhering surface and an exposed surface;

a first reflective metal layer deposited on the adhering surface of said first polyester film;

a second polyester film having a thermal shrinkage, said second polyester film having an adhering surface and an exposed surface;

a second reflective metal layer deposited on the adhering surface of said second polyester film; and a laminating adhesive interposed between said first and second reflective metal layers, a total thickness of said first and second polyester films being less than or equal to approximately 0.004 inch.

62. A process for manufacturing a laminated film for a thin film mirror, comprising the steps of:

(a) depositing a first reflective metal on an adhering surface of a transparent first polyester film having a thermal shrinkage, said first polyester film having an exposed surface disposed opposite the adhering surface;

(b) depositing a second reflective metal on an adhering surface of a second polyester film having a thermal shrinkage, said second polyester film having an exposed surface disposed opposite the adhering surface; and (c) affixing the first and second polyester films together with a laminating adhesive interposed therebetween, a total thickness of said first and second polyester films being less than or equal to approximately 0.004 inch.

* * * * *